United States Patent Office 2,823,228
Patented Feb. 11, 1958

2,823,228

PROCESS FOR THE TRANSFORMATION OF DIPHENIC ACID INTO OTHER DIPHENYL CARBOXYLIC ACIDS

Bernhard Raecke and Hubert Schirp, Dusseldorf, Germany, assignors to Henkel & Cie. G. m. b. H., Dusseldorf-Holthausen, Germany, a corporation of Germany No Drawing. Application April 11, 1955
Serial No. 500,671

Claims priority, application Germany April 12, 1954

7 Claims. (Cl. 260—515)

This invention relates to a process for the production of diphenyl carboxylic acids from diphenic acid, and more particularly to a method of producing 4,4'-diphenyl-dicarboxylic acid from diphenic acid.

We have found that diphenic acid can be very readily transformed into other valuable dipenyl carboxylic acids by heating monovalent alkali metal salts, particularly the dipotassium salt, of diphenic acid to high temperatures in a substantially oxygen-free, inert atmosphere. While the transformation reaction wil proceed at temperatures slightly below 340° C., it is necessary to heat diphenic acid to temperatures above 340° C. in order to achieve a sufficiently rapid transformation to give industrially attractive yields of 4,4'-diphenyl-dicarboxylic acid. The upper temperature limit at which the transformation reaction according to our invention will take place and produce attractive yields is determined largely by the nature of the starting material and the temperature at which such starting material will begin to decompose. In general, temperatures in excess of 500° C. will cause the diphenic acid salt to decompose and char, so that a serious decrease in yield results.

As previously stated, the transformation of diphenic acid into other diphenyl carboxylic acids in accordance with our invention takes place most advantageously in a substantially oxygen-free, inert atmosphere. An atmosphere of carbon dioxide has been found to produce particularly good yields, but other inert gases, such as nitrogen, may serve equally well to create the inert atmosphere.

The transformation reaction herein disclosed takes place at atmospheric, superatmospheric and subatmospheric pressures. However, the yields are most attractive when the reaction is carried out at superatmospheric pressures, for example at pressures above 40 atmospheres gauge.

The reaction can be carried out without the use of catalysts, but we have found that the transformation reaction can be favorably influenced by the presence of catalysts. In general, we have discovered that metals, such as zinc, cadmium, iron and lead, and compounds of such metals, particularly their oxides, have an especially favorable influence upon the speed of the reaction and the yields produced thereby. These catalysts may be present as such in the reaction mixture or in admixture with carrier substances, such as kieselguhr and the like.

To insure an efficient distribution of the heat of transformation throughout the starting material, it is advantageous to employ an autoclave or other suitable reaction vessel provided with a stirring device, or a rotary reaction vessel wherein the reactants are continuously agitated. Another method of insuring adequate heat distribution is to heat thin layers of the diphenic acid salt. For this purpose the reaction vessel may be provided with an insert composed of vertical and horizontal partitions or shelves, spaced at relatively small distances from each other, for example at about 1 to 3 cm. The diphenic acid salt is distributed in thin layers upon the horizontal shelves of this insert and is then heated in the inert atmosphere.

The even and uniform distribution throughout the starting material may further be enhanced by admixing certain inert substances with the diphenic acid salt, such as sand, coke, metal shavings, metal turnings, and metal chips. Similarly, the starting material may advantageously be admixed with inert salts, such as potassium carbonate, potassium sulfate, or potassium chloride.

The dipotassium salt of diphenic acid has proved to be an especially suitable starting material. However, other alkali metal salts of diphenic acid may also be used.

It is not necessary to provide the dipotassium salt of diphenic acid as such. The transformation reaction will also take place if mixtures of compounds are used as starting materials which, at the reaction temperature, will form the dipotassium salt of diphenic acid. For example, a mixture of diphenic acid anhydride and potassium carbonate may also be used as the starting material for the transformation of the diphenic acid salt into the 4,4'-diphenyl-dicarboxylic acid salt.

Substituted diphenic acid salts will also undergo the transformation reaction according to the present invention. For example, alkali metal salts of diphenic acid which carry substituents such as fluorine or chlorine atoms, or methyl and/or ethyl radicals on one or both of the phenyl radicals will yield the corresponding substituted 4,4'-diphenyl-dicarboxylic acid salts.

In addition to 4,4'-diphenyl-dicarboxylic acid, the process according to the present invention yields small amounts of other diphenyl carboxylic acids, particularly 4-diphenyl-monocarboxylic acid.

The starting materials are preferably provided in the form of substantially moisture-free powders. Such powders may be readily produced by spray-drying or drum-drying the respective compounds at temperatures of about 110° C., and storing the dry substances in airtight glass bottles, or other suitable containers, prior to their use as the starting materials in the transformation reaction of this invention.

The following example will further illustrate our invention and enable others skilled in the art to understand the invention more completely without, however, any intention on our part to limit our invention to this specific example.

*Example 1*

40 gm. of dry powdered dipotassium salt of diphenic acid were intimately admixed with 2 gm. cadmium oxide, and the mixture was placed into a rotary autoclave having a net volume of 0.2 liter. The autoclave was then closed and carbon dioxide was introduced therein until the internal pressure reached 50 atmospheres' gauge. The autoclave and its contents were then heated to 380° C. and maintained at that temperature for about two hours. The internal pressure rose steadily during that period until it reached a maximum of 130 atmospheres' gauge. Upon cooling, the contents were removed from the autoclave and dissolved in hot water. The resulting solution was filtered to remove insoluble cadmium oxide and diphenyl, and the filtrate was then acidified with hydrochloric acid while still hot. A precipitate was formed which was highly discolored and insoluble in all ordinary solvents. The precipitate was boiled twice with methanol and then dried. The methanol liquor yielded 7 gm. of a mixture of mono- and dicarboxylic acids of diphenyl, particularly the 4-monocarboxylic acid of diphenyl. The residue was identified to be 4,4'-diphenyl-dicarboxylic acid by transforming it into its dimethyl ester in accordance with well-known methods. Upon recrystallization from methanol the dimethyl ester was found to have a melting point of 212° C. According to M. Weiler, Beilstein, 32, page 1061, the melting point of the dimethyl ester is 212–213° C. The yield of 4,4′-diphenyl-dicarboxylic acid was 3.2 gm., which is 10.5% of the theoretical yield. Yields of a similar order of magnitude were obtained when zinc oxide or litharge or metallic lead was used as the catalyst instead of cadmium oxide.

While we have given specific embodiments of our invention, we wish it to be understood that our invention is not limited to such embodiments and that various changes and modifications may be made therein without departing from the spirit of the invention or the scope of the appended claims.

We claim:

1. The process of producing 4,4′-diphenyl-dicarboxylic acid which comprises heating an alkali metal salt of diphenic acid to a temperature above about 340° C. and below the temperature at which substantial decomposition of the starting material takes place in a substantially oxygen-free, inert atmosphere until an alkali metal salt of 4,4′-diphenyl-dicarboxylic acid is formed, transforming the 4,4′-diphenyl-dicarboxylic acid salt into 4,4′-diphenyl-dicarboxylic acid, and separating the 4,4′-diphenyl-dicarboxylic acid from the reaction mixture.

2. The process of producing 4,4′-diphenyl-dicarboxylic acid which comprises heating an alkali metal salt of diphenic acid to a temperature above about 340° C. and below the temperature at which substantial decomposition of the starting material takes place in a substantially oxygen-free atmosphere of an inert gas selected from the group consisting of carbon dioxide and nitrogen and in the presence of a catalyst containing a metal from the group consisting of cadmium, zinc, iron and lead until an alkali metal salt of 4,4′-diphenyl-dicarboxylic acid is formed, transforming the 4,4′-diphenyl-dicarboxylic acid salt into 4,4′-diphenyl-dicarboxylic acid, and separating the 4,4′-diphenyl-dicarboxylic acid from the reaction mixture.

3. The process of producing 4,4′-diphenyl-dicarboxylic acid which comprises heating an alkali metal salt of diphenic acid to a temperature above about 340° C. and below the temperature at which substantial decomposition of the starting material takes place in a substantially oxygen-free, inert atmosphere and in the presence of cadmium oxide as a catalyst until an alkali metal salt of 4,4′-diphenyl-dicarboxylic acid is formed, transforming the 4,4′-diphenyl-dicarboxylic acid salt into 4,4′-diphenyl-dicarboxylic acid, and separating the 4,4′-diphenyl-dicarboxylic acid from the reaction mixture.

4. The process of producing 4,4′-diphenyl-dichrboxylic acid which comprises heating the dipotassium salt of diphenic acid to a temperature between about 340° C. and 500° C. in a substantially oxygen-free, inert atmosphere of carbon dioxide and in the presence of cadmium oxide as a catalyst until the dipotassium salt of 4,4′-diphenyl-dicarboxylic acid is formed, transforming the 4,4′-diphenyl-dicarboxylic acid salt into 4,4′-diphenyl-dicarboxylic acid, and separating the 4,4′-diphenyl-dicarboxylic acid from the reaction mixture.

5. The method of transforming an alkali metal salt of diphenic acid into an alkali metal salt of 4,4′-diphenyl-dicarboxylic acid which comprises heating the alkali metal salt of diphenic acid to a temperature above about 340° C. and below the temperature at which substantial decomposition of the starting material takes place in a substantially oxygen-free, inert atmosphere and in the presence of a catalyst selected from the group consisting of cadmium, zinc, iron, lead, and oxides of these metals.

6. The method of transforming an alkali metal salt of diphenic acid into an alkali metal salt of 4,4′-diphenyl-dicarboxylic acid which comprises heating the alkali metal of diphenic acid to a temperature above about 340° C., and below the temperature at which substantial decomposition of the starting material takes place in a substantially oxygen-free atmosphere of an inert gas selected from the group consisting of carbon dioxide and nitrogen and in the presence of a catalyst selected from the group consisting of cadmium, zinc, iron, lead and oxides of these metals.

7. The process of transforming the dipotassium salt of diphenic acid itno the dipotassium salt of 4,4′-diphenyl-dicarboxylic acid which comprises heating the dipotassium salt of diphenic acid to a temperature between about 340° C. and about 500° C. in a substantially oxygen-free, inert atmosphere of carbon dioxide and in the presence of cadmium oxide as a catalyst.

No references cited.